(12) United States Patent
Yoshimura et al.

(10) Patent No.: US 11,523,048 B2
(45) Date of Patent: Dec. 6, 2022

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventors: Yuki Yoshimura, Tokyo (JP); Yoshihito Tamaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/178,129

(22) Filed: Feb. 17, 2021

(65) Prior Publication Data

US 2021/0258473 A1 Aug. 19, 2021

(30) Foreign Application Priority Data

Feb. 19, 2020 (JP) ............................ JP2020-025996

(51) Int. Cl.
*H04N 5/232* (2006.01)

(52) U.S. Cl.
CPC ... *H04N 5/23219* (2013.01); *H04N 5/232939* (2018.08)

(58) Field of Classification Search
CPC .................................................. H04N 13/383
See application file for complete search history.

(56) References Cited

U.S. PATENT DOCUMENTS

| | | | | |
|---|---|---|---|---|
| 9,529,428 | B1* | 12/2016 | Bhattacharya ... | H04N 5/232121 |
| 2009/0304232 | A1* | 12/2009 | Tsukizawa ........... | G06K 9/0061 |
| | | | | 382/103 |
| 2011/0273466 | A1* | 11/2011 | Imai ...................... | G09G 3/003 |
| | | | | 345/589 |
| 2013/0135196 | A1* | 5/2013 | Park ....................... | G06F 3/012 |
| | | | | 345/156 |
| 2013/0169754 | A1* | 7/2013 | Aronsson ............. | H04N 13/383 |
| | | | | 348/46 |
| 2013/0340006 | A1* | 12/2013 | Kwan ................. | H04N 21/2665 |
| | | | | 725/39 |
| 2014/0104392 | A1* | 4/2014 | Thorn .................... | H04N 7/147 |
| | | | | 348/46 |
| 2014/0168056 | A1* | 6/2014 | Swaminathan ....... | G06F 3/0481 |
| | | | | 345/156 |

(Continued)

FOREIGN PATENT DOCUMENTS

JP 05-297263 A 11/1993

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

An electronic device according to the present invention, includes at least one memory and at least one processor which function as: an acquisition unit configured to acquire gaze information relating to a gaze position of a user; and a display control unit configured to execute control for displaying a captured image on a display surface and for displaying a predetermined item in a first state at the gaze position on the display surface, wherein, in a case where a predetermined first condition is satisfied, the display control unit switches a display state of the predetermined item from the first state to a second state in which the predetermined item is displayed in a more subdued manner than the first state.

13 Claims, 6 Drawing Sheets

(56) References Cited

U.S. PATENT DOCUMENTS

| | | | |
|---|---|---|---|
| 2015/0325008 A1* | 11/2015 | Scarff | G09G 5/377 |
| | | | 345/605 |
| 2016/0109945 A1* | 4/2016 | Kempinski | G06F 3/013 |
| | | | 348/78 |
| 2016/0191910 A1* | 6/2016 | Von und zu Liechtenstein | |
| | | | G06F 3/013 |
| | | | 348/43 |
| 2017/0026565 A1* | 1/2017 | Hong | H04N 5/23212 |
| 2018/0227481 A1* | 8/2018 | Kimura | H04N 5/23219 |
| 2018/0288405 A1* | 10/2018 | Allen | H04N 5/23212 |

* cited by examiner

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device capable of acquiring line-of-sight information (gaze information) relating to user's lines of sight.

Description of the Related Art

Japanese Patent Application Laid-open No. H05-297263 discloses a method of selecting a focus point based on a detected line of sight of a user (photographer) looking into the view field of a viewfinder. The imaging apparatus disclosed in Japanese Patent Application Laid-open No. H05-297263 allows selection of a focus point in accordance with the degree of priority given to each of a plurality of focus point selection methods so that the focus point can be selected as intended by the user. The imaging apparatus disclosed in Japanese Patent Application Laid-open No. H05-297263 includes a viewfinder known as an optical finder that allows the user to view an optical image formed on a focusing screen.

Meanwhile, there have been imaging apparatuses having an electronic viewfinder instead of the optical finder in recent years. An electronic viewfinder is a display apparatus that reproduces images acquired by an image sensor that receives light beams passing through a photographing optical system. While an imaging apparatus with an optical finder includes a beam splitter, an imaging apparatus with an electronic viewfinder does not need a beam splitter and therefore is able to detect a focus or an object in a wider area within the shooting range.

Japanese Patent Application Laid-open No. H05-297263 discloses a technique whereby the display in the finder is subdued (visibility is lowered) when line-of-sight detection is to be prioritized, while line-of-sight detection is interrupted when the display in the finder is to be prioritized.

Sometimes, however, the existing imaging apparatus capable of detecting the user's gaze position (line of sight) and equipped with an electronic viewfinder fails to favorably control the display state of the detected gaze position. For example, in a situation where it is desirable to prioritize line-of-sight detection, or to prioritize the display in the finder, the need may arise to change the display state of the gaze position (e.g., display or hide) due to other factors. In such a case, favorable control of the display state of the gaze position is not possible with the technique disclosed in Japanese Patent Application Laid-open No. H05-297263.

SUMMARY OF THE INVENTION

The present invention provides a technique that enables favorable control of a display state of a gaze position.

An electronic device according to the present invention, includes at least one memory and at least one processor which function as: an acquisition unit configured to acquire gase information relating to a gaze position of a user; and a display control unit configured to execute control for displaying a captured image on a display surface and for displaying a predetermined item in a first state at the gaze position on the display surface, wherein, in a case where a predetermined first condition is satisfied, the display control unit switches a display state of the predetermined item from the first state to a second state in which the predetermined item is displayed in a more subdued manner than the first state.

Further features of the present invention will become apparent from the following description of exemplary embodiments with reference to the attached drawings.

DESCRIPTION OF THE EMBODIMENTS

Figure 1:
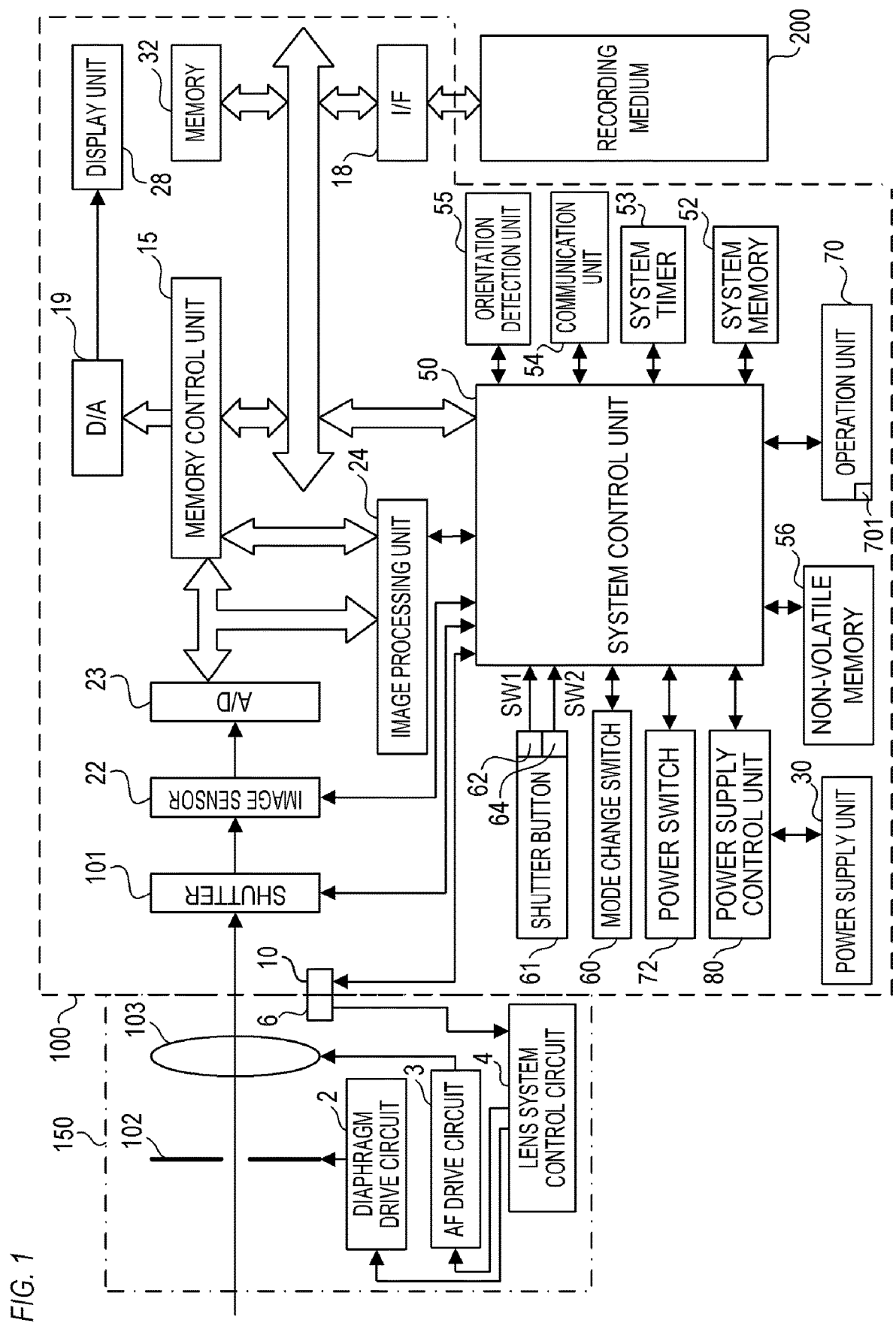
FIG. 1 is a block diagram illustrating a configuration example of an imaging apparatus according to the embodiment.

The present invention will be hereinafter described in detail based on its illustrative embodiments with reference to the accompanying drawings. The following embodiments shall not limit the present invention. While a plurality of features are described below, it does not mean that all of them are essential for the present invention. The plurality of features described below may be combined in any way. Same or similar constituent elements in the accompanying drawings are given the same reference numerals to omit repetitive description.

The following embodiments will be described in relation to a case where the present invention is applied to an imaging apparatus (specifically, a lens-changeable digital camera). However, the present invention is applicable to any electronic device to which a line-of-sight information acquisition function (function that acquires line-of-sight information (gaze information) relating to a line of sight of a user) can be installed. Such electronic device includes a video camera, computer equipment (personal computer, tablet computer, media player, PDA, etc.), mobile phone, smartphone, game machine, robot, drone, drive recorder, and so on. These are only examples and the present invention can be applied to other electronic devices. While the digital camera described below includes a line-of-sight detection function, imaging function, display function, etc., the present invention is also applicable to a configuration that has these functions separately installed on several mutually communicable devices (e.g., a main machine and a remote controller).

[Configuration]

FIG. 1 is a block diagram illustrating a configuration example of a digital camera system as one example of electronic device according to the embodiment of the present invention. The digital camera system includes a main body 100 of a lens-changeable digital camera, and a lens unit 150 removably attached to the main body 100. The lens changeability is not essential for the present invention.

The lens unit 150 includes a communication terminal 6 that makes contact with a communication terminal 10 provided to the main body 100 when attached to the main body 100. Power is supplied from the main body 100 to the lens unit 150 via the communication terminal 10 and communication terminal 6. A lens system control circuit 4 of the lens unit 150 and a system control unit 50 of the main body 100 are mutually communicable via the communication terminal 10 and communication terminal 6.

The lens unit 150 includes a lens assembly 103 that is an imaging optical system composed of a plurality of lenses including a movable lens. The movable lens at least includes a focus lens. Depending on the lens unit 150, one or more of a zoom lens, a blur correction lens, and so on, can further be included. An AF drive circuit 3 includes a motor, an actuator and the like for driving the focus lens. The focus lens is driven by the lens system control circuit 4 controlling the AF drive circuit 3. A diaphragm drive circuit 2 includes a motor actuator and the like for driving a diaphragm 102. The aperture size of the diaphragm 102 is adjusted by the lens system control circuit 4 controlling the diaphragm drive circuit 2.

A mechanical shutter 101 is driven by the system control unit 50 to adjust the exposure time of an image sensor 22. The mechanical shutter 101 is kept fully open when shooting a movie.

The image sensor 22 is a CCD image sensor or a CMOS image sensor, for example. The image sensor 22 includes two-dimensionally arranged multiple pixels, each pixel being provided with one micro lens, one color filter, and one or more opto-electronic conversion units. In this embodiment, each pixel includes a plurality of opto-electronic conversion units and each pixel is configured to be able to output a signal from each of the opto-electronic conversion units. The pixels configured this way enable generation of image signals for captured images, stereoscopic image pairs, and phase-difference AF, from signals read out from the image sensor 22.

Figure 2A:
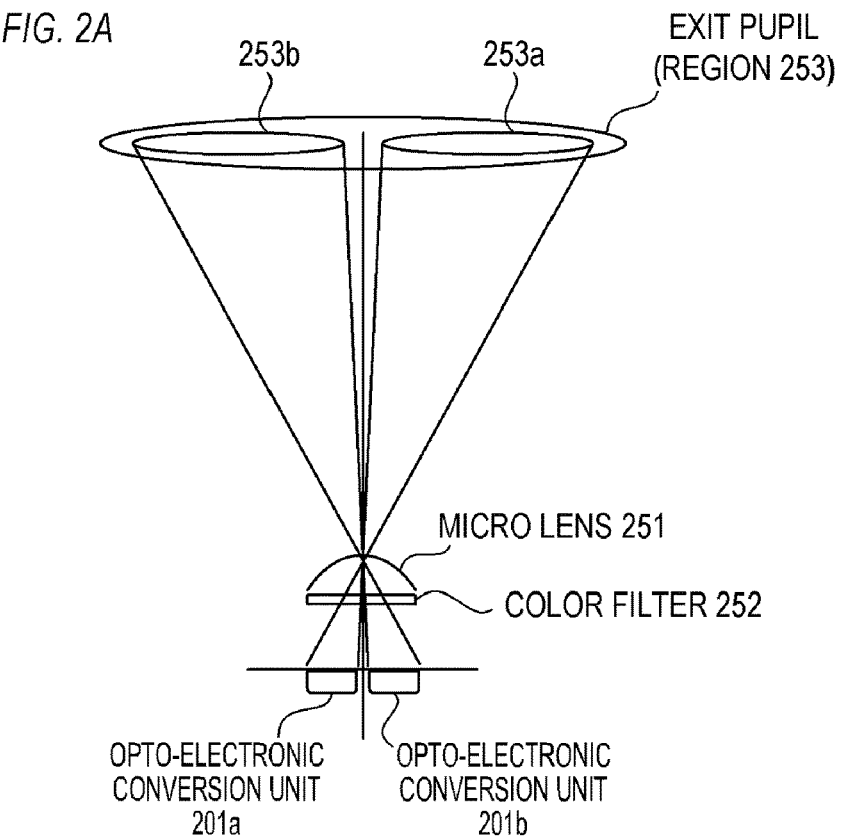
FIG. 2A and FIG. 2B are diagrams illustrating an example of correspondence between an exit pupil and an optoelectronic conversion unit of an imaging apparatus according to the embodiment.

FIG. 2A is a schematic diagram illustrating the correspondence between an exit pupil of the lens unit 150 and each of opto-electronic conversion units when each pixel of the image sensor 22 has two opto-electronic conversion units.

The two opto-electronic conversion units 201a and 201b provided to the pixel share one color filter 252 and one micro lens 251. Light that has passed through a partial region 253a and a partial region 253b of the emission exit (region 253) enters the opto-electronic conversion unit 201a and the opto-electronic conversion unit 201b, respectively.

Therefore, a pair of stereoscopic images are formed by images respectively formed by signals read out from the opto-electronic conversion units 201a and opto-electronic conversion units 201b of the pixels included in a given pixel area. The stereoscopic image pair can be used as image signals (A image signal and B image signal) for phase-difference AF. Further, a normal image signal (captured image) can be obtained by adding signals respectively read out from the opto-electronic conversion units 201a and opto-electronic conversion units 201b of each pixel.

Figure 2B:
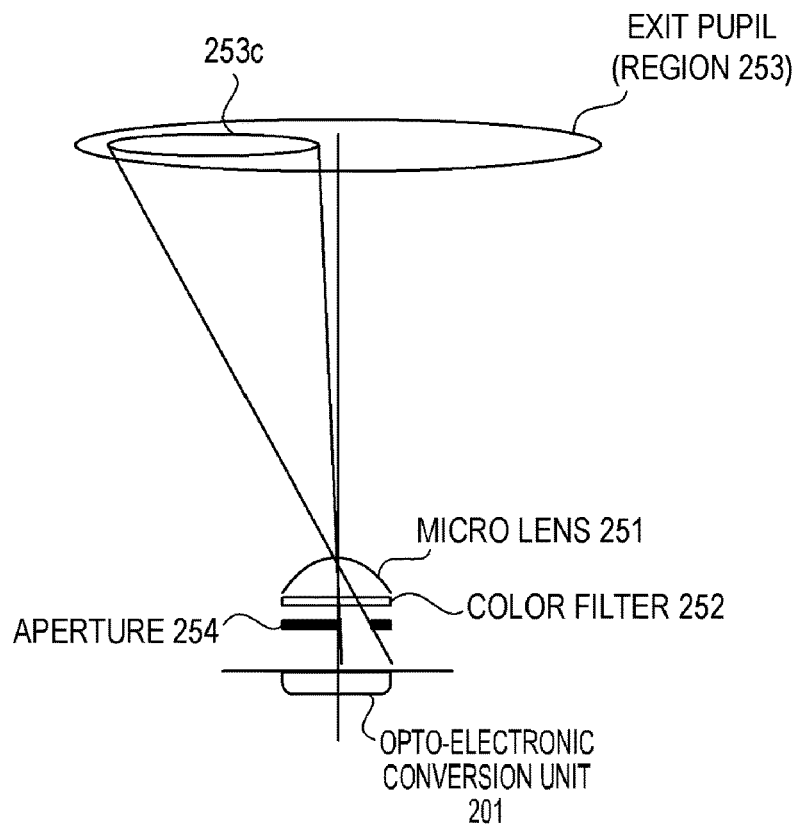

In this embodiment, each pixel of the image sensor 22 functions both as the pixel for generating a signal for phase-difference AF (focus detection pixel) and the pixel for generating a normal image signal (imaging pixel). Optionally, some of the pixels of the image sensor 22 may be configured as the focus detection pixels, and the other pixels may be configured as imaging pixels. FIG. 2B illustrates an example of correspondence between a focus detection pixel and a region 253 of the exit pupil through which the incident light passes. The opto-electronic conversion unit 201 of the focus detection pixel illustrated in FIG. 2B functions similarly to the opto-electronic conversion unit 201b of FIG. 2A with the use of the aperture 254. It is practically possible to set a focus detection area of any size anywhere by distributing the focus detection pixel illustrated in FIG. 2B, and another type of focus detection pixel that functions similarly to the opto-electronic conversion unit 201a of FIG. 2A over the entire image sensor 22.

While the configuration illustrated in FIG. 2A and FIG. 2B is that of an image sensor for obtaining images to be recorded, which is used as the sensor for phase-difference AF, the present invention can be embodied for any other types of AF, such as for autofocusing that allows setting of a focus detection area of any size and location. For example, the present invention is applicable also to a configuration that uses contrast AF. In the case of using only the contrast AF, each pixel has only one opto-electronic conversion unit.

Referring back to FIG. 1, an A/D converter 23 is used for converting an analog image signal output from the image sensor 22 into a digital image signal (image data). The A/D converter 23 may be included in the image sensor 22.

The image data (RAW image data) output by the A/D converter 23 is processed as required at an image processing unit 24, and stored in a memory 32, via a memory control unit 15. The memory 32 is used as a buffer memory for storing image data or audio data temporarily, or as a video memory for a display unit 28.

The image processing unit 24 applies predetermined image processing to the image data to generate a signal or image data, or acquire and/or generate various pieces of information. The image processing unit 24 may be a dedicated hardware circuit such as an ASIC designed to realize specific functions, for example, or a configuration with a processor such as a DSP executing software to realize specific functions.

The image processing the image processing unit 24 applies here includes pre-processing, color interpolation, correction, detection, data processing, evaluation value calculation, and so on. Pre-processing includes signal amplification, reference level adjustment, defect pixel correction, and so on. Color interpolation is a process of interpolating the values of color components not contained in the image data and also called demosaicing. Correction includes white balance adjustment, correction of luminance of the image, correction of optical aberrations of the lens unit 150, color calibration, and so on. Detection includes detection and tracking of a characteristic area (e.g., face area, human body area), identification of a person, and so on. Data processing includes scaling, encoding, decoding, header information generation, and so on. Evaluation value calculation includes calculation of evaluation values of pairs of image signals for phase-difference AF, or for contrast AF, evaluation values used for automatic exposure control, and so on. These are examples of image processing the image processing unit 24 can carry out, and should not be understood as limiting the image processing carried out by the image processing unit 24. The evaluation value calculation may be performed by the system control unit 50.

A D/A converter 19 generates an analog signal suited to display at the display unit 28 from the image data for display stored in the memory 32, and supplies the generated analog signal to the display unit 28. The display unit 28 includes a liquid crystal display apparatus, for example, and executes display on the basis of the analog signal from the D/A converter 19 on a display surface.

Shooting a movie (imaging control) while displaying the footage (display control) continuously allows the display unit 28 to function as an electronic view finder (EVF). The movie displayed to cause the display unit 28 to function as an EVF is called a live view image. The display unit 28 may be provided inside the main body 100 to be viewed through an eyepiece, or may be provided on a housing surface of the main body 100 to be viewable without an eyepiece. The display unit 28 may be provided to both of inside the main body 100 and on the housing surface.

The system control unit 50 is a CPU (also called MPU or microprocessor), for example. The system control unit 50 controls the operations of the main body 100 and the lens unit 150 by reading a program stored in a non-volatile memory 56 into a system memory 52 and executing the program to realize the functions of the camera system. The system control unit 50 sends various commands to the lens system control circuit 4 via communication through the communication terminals 10 and 6 to control the operation of the lens unit 150.

The non-volatile memory 56 stores the program executed by the system control unit 50, various setting values of the camera system, image data of a GUI (Graphical User Interface), and so on. The system memory 52 is a main memory the system control unit 50 uses when executing a program. The data (information) stored in the non-volatile memory 56 may be re-writable.

The system control unit 50, as one of the operations it performs, carries out an automatic exposure control (AE) process based on an evaluation value generated by the image processing unit 24 or itself, to determine a shooting condition. The shooting conditions for capturing a still image are the shutter speed, aperture value, and sensitivity, for example. The system control unit 50 determines one or more of the shutter speed, aperture value, and sensitivity in accordance with an AE mode that has been set. The system control unit 50 controls the aperture value (aperture size) of the diaphragm mechanism in the lens unit 150. The system control unit 50 also controls the operation of the mechanical shutter 101.

The system control unit 50 drives the focus lens of the lens unit 150 on the basis of an evaluation value or an amount of defocus generated by the image processing unit 24 or itself, to perform autofocus detection (AF) causing the lens assembly 103 to focus on an object within a focus detection area.

A system timer 53 is a built-in clock and used by the system control unit 50.

An operation unit 70 includes a plurality of input devices (button, switch, dial, and so on) the user can operate. Some of the input devices of the operation unit 70 have a name corresponding to the assigned function. While a shutter button 61, a mode change switch 60, a power switch 72 are illustrated separately from the operation unit 70 for convenience, these are included in the operation unit 70. When the display unit 28 is a touch display including a touchscreen, the touchscreen is also included in the operation unit 70. Operations of the input devices included in the operation unit 70 are monitored by the system control unit 50. When the system control unit 50 detects an operation of an input device, the system control unit 50 executes processing in accordance with the detected operation.

The shutter button 61 includes a first shutter switch 62 that turns on and outputs a signal SW1 when half-pressed, and a second shutter switch 64 that turns on and outputs a signal SW2 when fully pressed. When the system control unit 50 detects the signal SW1 (first shutter switch 62 ON), the system control unit executes a preparatory operation for shooting a still image. The preparatory operation includes the AE process and AF process. When the system control unit 50 detects the signal SW2 (second shutter switch 64 ON), the system control unit executes shooting of a still image (imaging and recording operations) in accordance with the shooting condition determined by the AE process.

The operation unit 70 of this embodiment includes a line-of-sight detection unit 701 that detects the line of sight (direction of line of sight) of a user and outputs the detection results (line-of-sight information regarding the user's line of sight). The system control unit 50 can execute various control processes in accordance with the line-of-sight information provided by the line-of-sight detection unit 701. Although the line-of-sight detection unit 701 is not a component directly operated by the user, it is included in the operation unit 70 because the line of sight detected by the line-of-sight detection unit 701 is dealt with as an input.

Figure 3A:
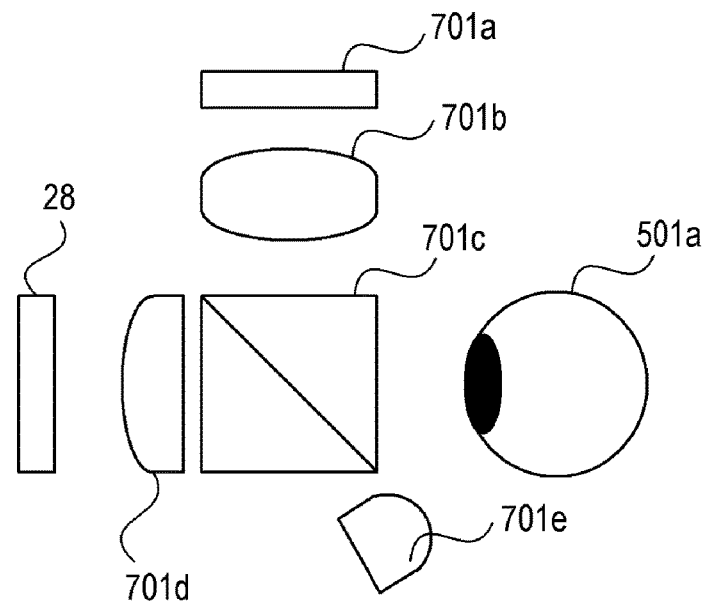
FIG. 3A and FIG. 3B are diagrams illustrating a configuration example of a line-of-sight detection unit according to the embodiment.

FIG. 3A is a schematic side view illustrating a configuration example of the line-of-sight detection unit 701 inside a finder. The line-of-sight detection unit 701 detects the rotation angle of the optical axis of the eyeball 501a of a user who is looking at the display unit 28 provided inside the main body 100 through the eyepiece of the finder. The line-of-sight detection unit is able to locate the position in the display unit 28 the user is gazing at (point of gaze in the displayed image) based on the detected direction of line of sight.

The display unit 28 displays a live view image, for example, and the user peering in through the window of the eyepiece can observe the displayed contents of the display unit 28 through an eye lens 701d and a dichroic mirror 701c. A light source 701e can emit infrared light toward the direction of the eyepiece window (toward outside of the main body 100). When the user is peering into the finder, the infrared light emitted by the light source 701e is reflected by the eyeball 501a and returns into the finder. The infrared light incident in the finder is reflected toward a light-receiving lens 701b by the dichroic mirror 701c.

The light-receiving lens 701b forms an infrared image of the eyeball on the imaging plane of an image sensor 701a. The image sensor 701a is a two-dimensional imaging device having a filter for the infrared imaging. The image sensor 701a for the line-of-sight detection may have a fewer number of pixels than that of the image sensor 22 for shooting. The eyeball image captured by the image sensor 701a is sent to the system control unit 50. The system control unit 50 locates the positions of the retinal reflection of infrared light and the pupil in the eyeball image and detects the line-of-sight direction from the positional relationship between them. The system control unit 50 locates the position in the display unit 28 the user is gazing at (point of gaze in the displayed image) based on the detected line-of-sight direction. Alternatively, the positions of the retinal reflection and the pupil in the eyeball image may be located by the image processing unit 24, and the system control unit 50 may obtain their locations from the image processing unit 24.

Figure 3B:
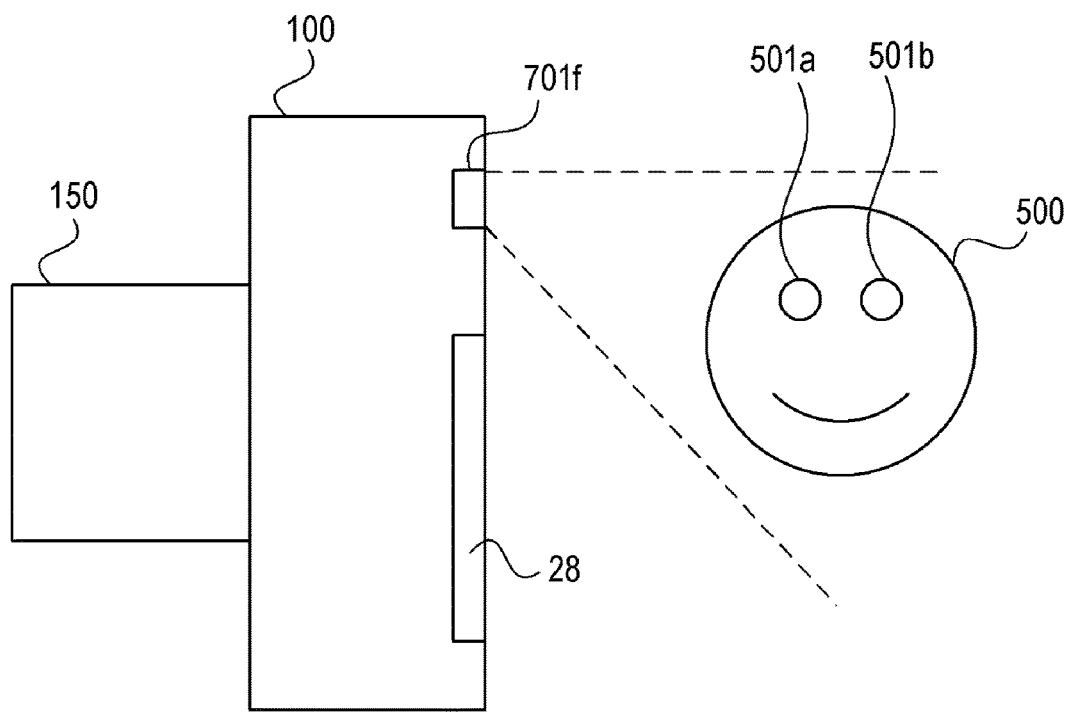

The present invention does not depend on the method of detecting the line of sight or the configuration of the line-of-sight detection unit. The configuration int the line-of-sight detection unit 701 is not limited to the one illustrated in FIG. 3A. For example, as illustrated in FIG. 3B, the line of sight nay be detected based on an image captured by a camera 701f disposed near the display unit 28 on the back side of the main body 100. The angle of view of the camera 701*f* indicated with broken lines is determined such that the face of a user shooting while looking at the display unit 28 is captured. The line-of-sight direction can be detected based on an image of an eye area (area including at least one of the eyeball 501*a* and the eyeball 501*b*) that is located in an image captured by the camera 701*f*. In the case of using infrared image sensory, a light source 701*e* may be disposed near the camera 701*f* to capture the image of an object inside the angle of view while projecting infrared light. In this case, the method of detecting the line-of-sight direction from the obtained image may be similar to that of FIG. 3A. In the case of using visible light image sensory, no light need to be projected. When using visible light images, the line-of-sight direction can be detected from the positional relationship between the inner corner of the eye and the iris in the eye area.

Referring back to FIG. 1, a power supply control unit 80 is composed of a battery detection circuit, a DC-DC converter, a switch circuit that switches the blocks to be powered, and so on, and detects the presence or absence of a battery being mounted, the type of battery, and remaining battery charge. The power supply control unit 80 controls the DC-DC converter on the basis of the detection results and instructions from the system control unit 50, and supplies a necessary voltage to various units including a recording medium 200 for a necessary period of time.

A power supply unit 30 includes a battery, an AC adapter, and so on. An I/F 18 is an interface for the recording medium 200 such as a memory card, a hard disk, and so on. Data files such as captured images and audio are recorded in the recording medium 200. The data files recorded in the recording medium 200 are read out through the I/F 18, and can be played back via the image processing unit 24 and the system control unit 50.

A communication unit 54 realizes communication with an external device by at least one of wireless communication and wired communication. Images captured by the image sensor 22 (captured images, including live view images), and images recorded in the recording medium 200 can be sent to the external device via the communication unit 54. Image data and various other pieces of information can be received from an external device via the communication unit 54.

An orientation detection unit 55 detects the orientation of the main body 100 relative to the direction of gravity. The orientation detection unit 55 may be an angular velocity sensor, or an angular velocity sensor. The system control unit 50 can record orientation information in accordance with the orientation detected by the orientation detection unit 55 during shooting in the data file in which the image data obtained by the shooting is stored. The orientation information can be used, for example, for displaying the recorded image in the same orientation as when it was captured.

The main body 100 of this embodiment can carry out various control processes to make a characteristic area detected by the image processing unit 24 an appropriate image. For example, the main body 100 can carry out autofocus detection (AF) for causing the characteristic area to come into focus, and automatic exposure control (AE) for giving a correct exposure to the characteristic area. The main body 100 can also carry out automatic white balance for setting a correct white balance for the characteristic area, and automatic flash adjustment for regulating the amount of light to achieve a correct brightness for the characteristic area. Control processes to correctly display the characteristic area are not limited to these. The image processing unit 24 applies a known method to a live view image, for example, detects areas determined to comply with the definition of a predetermined characteristic as characteristic areas, and outputs information such as the position, size, and reliability of each characteristic area to the system control unit 50. The present invention does not depend on the type of the characteristic area or the method of detecting the characteristic area. Since a known method can be used to detect characteristic areas, the description of the method of detecting characteristic areas is omitted.

Feature areas can also be used for detecting object information. When the characteristic area is a face area, for example, whether the red-eye effect is appearing, whether the eyes are closed, or expressions (e.g., smile) are detected as object information. The object information is not limited to these.

This embodiment allows for selection of one characteristic area (main object area) that is to be used for various control processes or for obtaining object information, using the line of sight of the user, from a plurality of characteristic areas that are for example multiple image areas of varying sizes and positions. A user's act of directing the line of sight such as to be detected by the line-of-sight detection unit 701 can be called an input of line of sight.

[Operation]

Figure 4:
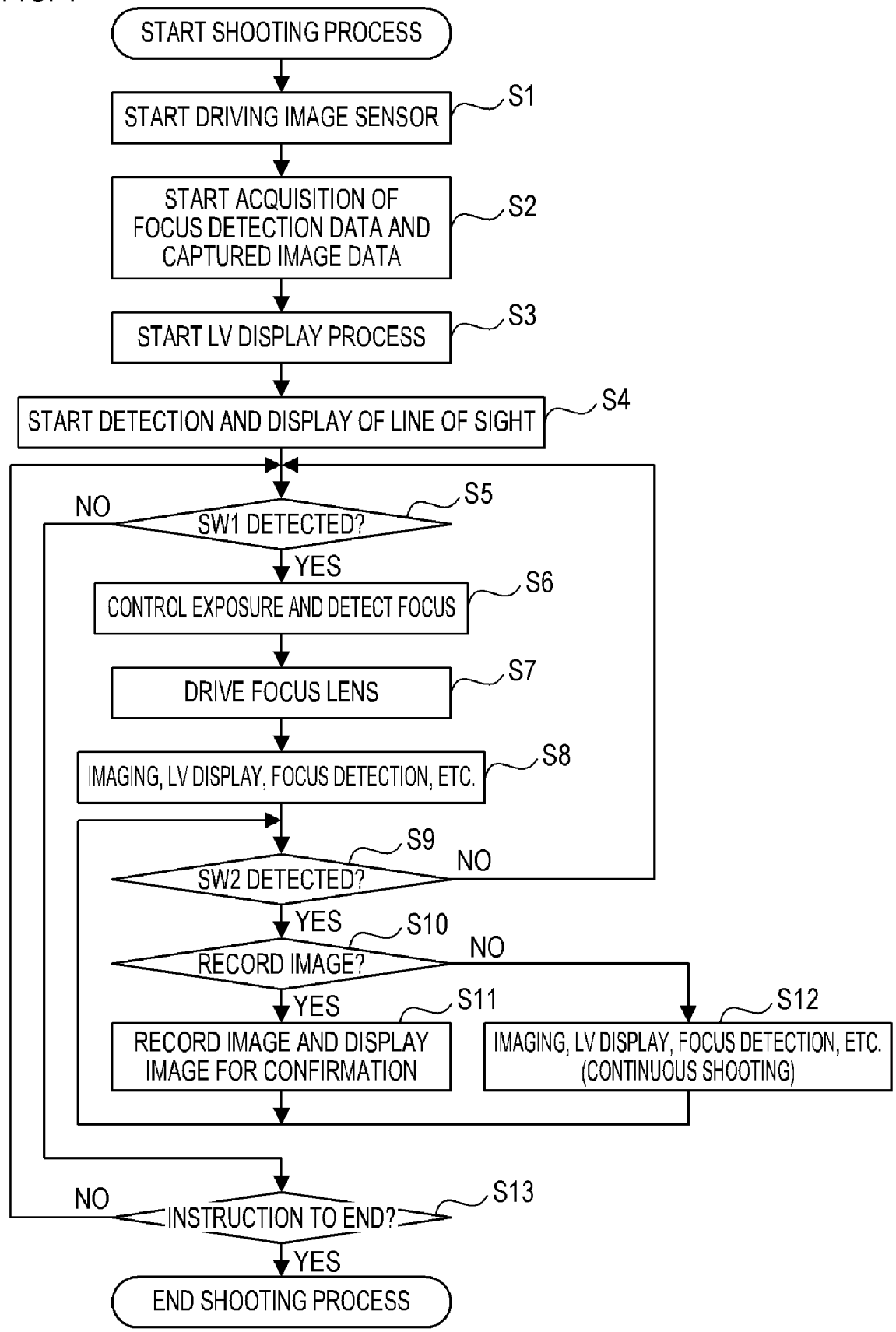
FIG. 4 is a flowchart illustrating an example of a shooting process according to the embodiment.

A shooting process performed in the main body 100 is described below with reference to FIG. 4. FIG. 4 is a flowchart of the shooting process according to the embodiment. The process of FIG. 4 is started upon start-up of the main body 100 in a shooting mode, or upon setting of a shooting mode as the mode of the main body 100.

At step S1, the system control unit 50 starts driving the image sensor 22, to initiate acquisition of imaging data (image). Images having a sufficient resolution at least for one of focus detection, object detection, and live view display are successively obtained. Since the driving operation here is performed for shooting a movie for live view display, images are taken using a process known as an electronic shutter operation in which charge is accumulated for a time in accordance with a live view frame rate each time imaging data is read out. Live view display is a display method that allows the display unit 28 to function as an electronic view finder (EVF), which shows an object substantially in real time. The live view is displayed for example for the user (photographer) to check the shooting range or shooting conditions. The frame rate for live view display is 30 frames/s (imaging interval of 33.3 ms) or 60 frames/s (imaging interval of 16.6 ms), for example.

At step S2, the system control unit 50 starts a process of acquiring focus detection data and captured image data from the current imaging data. The focus detection data includes data of a first image and a second image that are a pair of stereoscopic images in a focus detection area. For example, the data of pixels that form the first image and second image is respectively obtained from the opto-electronic conversion units 201*a* and 201*b* of FIG. 2A Captured image data is the data of the captured image, which is obtained by adding up the data of the first image and second image, and applying color interpolation and the like by the image processing unit 24. This way, focus detection data and captured image data can be acquired in one shooting. In the case where the focus detection pixels and imaging pixels are configured as different pixels, the captured image data is acquired by an interpolation process or the like for obtaining pixel values at the positions of the focus detection pixels.

At step S3, the system control unit 50 starts a live view display process. In the live view display process, the system control unit 50 generates an image for live view display from the current captured image (captured image data), using the image processing unit 24, and displays the generated image in an image display area of the display unit 28. The image display area is one of the entire area of the display surface of the display unit 28, the entire area of a screen (such as a window) presented in the display unit 28, and some area of the display surface or the screen. The image for live view display may be an image reduced in accordance with the resolution of the display unit 28, for example. The image processing unit 24 can perform a reduction process when generating the captured image. In this case, the system control unit 50 displays the generated captured image (image after the reduction process) in the display unit 28. As described above, the live view display that shows the object substantially in real time allows the user to adjust the composition or exposure conditions during the shooting with ease while checking the live view display. Moreover, in this embodiment, the main body 100 is capable of detecting an object such as the face of a person or an animal from the captured image. Accordingly, a frame or the like indicating the area of the object being detected can also be shown in the live view display.

At step S4, the system control unit 50 starts line-of-sight detection and focus detection. In line-of-sight detection, the line-of-sight detection unit 701 acquires line-of-sight information that indicates the line-of-sight position (user's gaze position) on the display surface of the display unit 28 at a predetermined time interval in association with the captured image the user was looking at. At step S4, the system control unit 50 also starts display of a predetermined item (such as a circle) at the gaze position on the display surface of the display unit 28 in order to notify the user of the detected gaze position. Focus detection will be described later.

Figure 5A:
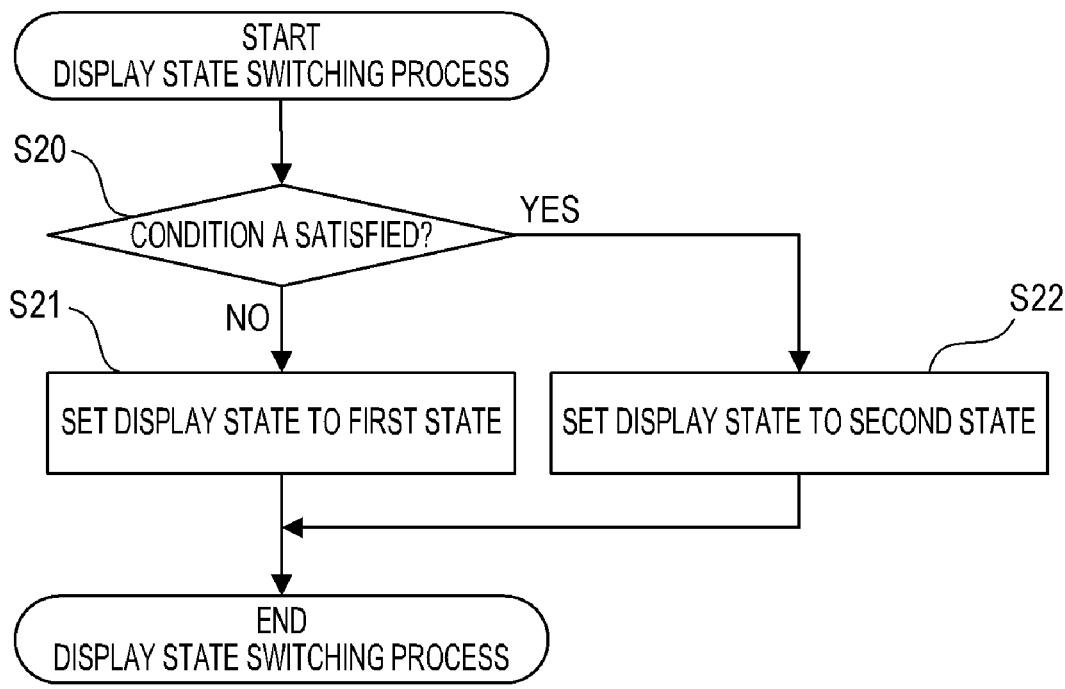
FIG. 5A and FIG. 5B are flowcharts illustrating an example of a switching process according to the embodiment.
Figure 6A:
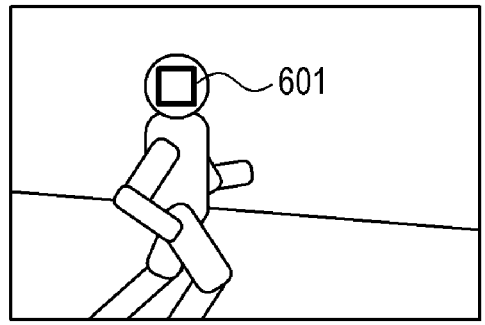
FIG. 6A to FIG. 6C are diagrams illustrating display examples according to the embodiment.
Figure 6B:
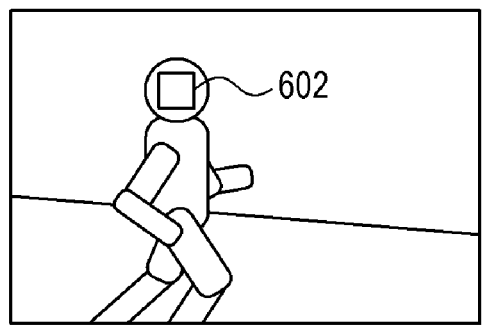
Figure 6C:
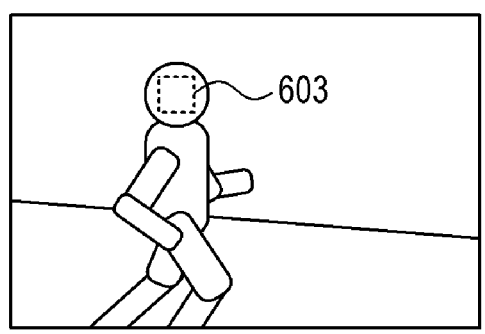

In this embodiment, depending on whether or not predetermined Condition A is satisfied, the display state of the gaze position is switched between a first state in which the gaze position (predetermined item) is always displayed, and a second state in which the display of the gaze position is more subdued than in the first state by a change in line style, blinking, or a change of color. FIG. 6A illustrates a display example of the first state, and FIG. 6B and FIG. 6C illustrate display examples of the second state. In the first state shown in FIG. 6A, the gaze position is indicated with a thick line 601. In the second state shown in FIG. 6B, the gaze position is indicated with a thin line 602. In the second state shown in FIG. 6C, the gaze position is indicated with a broken line 603. The second state may be understood as a display state where the visibility of the gaze position is lower than in the first state. FIG. 5A is a flowchart of this switching process (display state switching process).

At step S20, the system control unit 50 determines whether or not Condition A has been satisfied. The system control unit 50 advances the process to step S22 if it determines that Condition A has been satisfied, and advances the process to step S21 if it determines that Condition A has not been satisfied. At step S21, the system control unit 50 executes control to set the display state of the gaze position to the first state where the gaze position is always displayed. At step S22, the system control unit 50 executes control to set the display state of the gaze position to the second state where the display of the gaze position is subdued from the first state by hiding, blinking, or a change of color.

Credibility of the line-of-sight information (matching degree between the position indicated by line-of-sight information and the position the user aims to gaze at) is not constant and can vary. When the degree of reliability of the line-of-sight information is less than a predetermined threshold, it is highly likely that a process based on the line-of-sight information is not done as intended by the user. Therefore, it is preferable to include the condition that the degree of reliability of the line-of-sight information is less than a predetermined threshold in Condition A. Let us now assume that the condition that the degree of reliability of the line-of-sight information is less than a predetermined threshold is used as Condition A. The system control unit 50 calculates the degree of reliability of the acquired line-of-sight information every time it acquires line-of-sight information when performing the switching process of FIG. 5A. At step S20, the system control unit 50 determines whether or not the degree of reliability of the line-of-sight information is less than a predetermined threshold. If the degree of reliability is equal to or more than the predetermined threshold, the process goes to step S21, where the system control unit 50 executes control to set the display state of the gaze position to the first state. If the degree of reliability is less than the predetermined threshold, the process goes to step S22, where the system control unit 50 executes control to set the display state of the gaze position to the second state. The display state of the gaze position can be favorably controlled this way. Specifically, the user can readily understand whether or not the main body 100 has acquired high-reliability line-of-sight information, and whether or not it is likely that a process based on the line-of-sight information may not be done as intended by the user. The method of calculating the degree of reliability of line-of-sight information is not limited to a particular one. Instead of calculating the degree of reliability of line-of-sight information, the system control unit 50 may detect a state corresponding to the state where the degree of reliability of the line-of-sight information is less than a predetermined threshold (to be described later in detail).

Referring back to FIG. 4, at step S5, the system control unit 50 determines whether or not the signal SW1 (first shutter switch 62 ON; instruction to get set for shooting; half-pressed state of the shutter button 61) has been detected. The system control unit 50 advances the process to step S6 if it determines that the signal SW1 has been detected, and advances the process to step S13 if it determines that the signal SW1 has not been detected.

At step S6, the system control unit 50 sets a focus detection area, and carries out focus detection that was started at step S4. Here, the system control unit 50 sets a focus detection area based on the current gaze position and the position of an object detected from a current captured image. For example, an object closest to the gaze position is picked up from a plurality of detected objects, and the area around the object (including the gaze position) may be set as the focus detection area. The system control unit 50 detects a focus position (focus point) where the image is in focus in the focus detection area. From the step S6 onwards, focus detection using the line-of-sight information (including the setting of a focus detection area) is repeatedly carried out. The method of setting a focus detection area before the acquisition of line-of-sight information is not limited to a particular one. For example, an area of an object selected by the user as the user wishes may be set as the focus detection area.

In detecting the focus, the system control unit 50 also controls exposure to enhance (secure) the accuracy of focus detection. The system control unit 50 is able to determine the exposure state at the gaze position from the exposure information acquired through the control of exposure (exposure information of the captured image). If the exposure state at the gaze position is a saturated state (high-brightness state) or a low-brightness state, it is highly likely that the user is not being able to see the object at the gaze position correctly, i.e., the reliability of the visibility information is probably low. Therefore, it is preferable to include the condition that the exposure at the gaze position is incorrect or outside a predetermined range in Condition A when carrying out the switching process in FIG. 5A. The switching process is performed after exposure information has been acquired through control of exposure. A saturated state is a state in which the exposure exceeds the upper limit of the predetermined range, and a low-brightness state is a state in which the exposure is less than the lower limit of the predetermined range. A state in which the exposure at the gaze position is incorrect or out of a predetermined range (saturated state or low-brightness state) can be regarded as a state in which the degree of reliability of line-of-sight information is less than a predetermined threshold.

Now let us consider a case where the condition that the exposure at the gaze position is incorrect or outside a predetermined range is included in Condition A in the switching process in FIG. 5A. At step S20, the system control unit 50 determines whether or not the exposure at the gaze position is outside a predetermined range and incorrect based on the acquired exposure information. If the exposure is not incorrect (if the exposure is correct), the process goes to step S21, where the system control unit 50 executes control to set the display state of the gaze position to the first state. If the exposure is incorrect, the process goes to step S22, where the system control unit 50 executes control to set the display state of the gaze position to the second state.

While one example has been described in which the exposure state at the gaze position is determined from exposure information acquired through control of exposure when detecting a focus, the method or timing of determining the exposure state at the gaze position is not limited to this. The exposure state at the gaze position may be determined by other methods and at other timings.

In focus detection, an image displacement (phase difference) between the first image and the second image that are the pair of stereoscopic images in the focus detection area is calculated, and a defocus amount (vector including magnitude and direction) in the focus detection area is calculated from the image displacement. The focus detection is explained in more specific terms below.

First, the system control unit 50 applies shading correction to the first image and second image to reduce the difference in light amount (difference in brightness) between the first image and the second image. After the shading correction the system control unit 50 applies a filtering process to the first image and second image to extract a spatial frequency image (data) for the detection of a phase difference.

After the filtering process, the system control unit 50 next performs a shifting process of relatively shifting the first image and second image in a pupil splitting direction to calculate a correlation value that indicates the matching degree of the first image and second image.

The correlation value COR(s1) can be calculated using the following formula where A(k) represents data of a k-th pixel of the first image after the filtering process, B(k) represents data of a k-th pixel of the second image after the filtering process, W represents an area of number k corresponding to a focus detection area, s1 represents an amount of shift in the shifting process, and Γ1 represents an area of the amount of shift s1 (shifting area).

[Math. 1]

$$COR(s1) = \Sum_{k \in W} |A(k) - B(k-s1)| \, s1 \in \Gamma 1 \qquad \text{(Formula 1)}$$

First, the shifting process with an amount of shift s1 matches data B(k−s1) of a (k−s1)th pixel of the second image after the filtering process to the data A(k) of a k-th pixel of the first image after the filtering process. Next, the data B(k−s1) is subtracted from the data A(k) and absolute values of subtraction results are produced. Then the total sum of the produced absolute values in an area W corresponding to the focus detection area is calculated as the correlation value COR(s1). The amount of correlation may be calculated for each line, and added up over several lines for each amount of shift, as required.

Next, the system control unit 50 produces an image displacement p1, which is a real-valued amount of shift with which the correlation value becomes smallest, by subpixel operation from the correlation value. The system control unit 50 then multiplies the calculated image displacement p1 with a conversion coefficient K1 that corresponds to an image height of the focus detection area, an F value of the imaging lens (image-forming optical system; imaging optical system), and an exit pupil distance, to produce the defocus amount.

At step S7, the system control unit 50 drives the focus lens based on the defocus amount detected (calculated) at step S6. When the detected defocus amount is smaller than a predetermined value, the focus lens need not necessarily be driven.

Driving (moving) the focus lens causes an image plane movement, and a change occurs in the captured image. Such change in the captured image is large when the defocus amount is large. It is difficult for a user to anticipate such a change in the captured image. When the focus lens is driven largely or quickly, it is highly likely that the user's gaze can no longer follow the object well enough, which means that the reliability of the visibility information likely reduces. Therefore, it is preferable to include the condition that the driving amount of the focus lens is larger than a predetermined threshold, or the condition that the driving speed of the focus lens is larger than a predetermined threshold in Condition A when carrying out the switching process in FIG. 5A. The switching process is performed before (When) the focus lens is driven. The system control unit 50 is able to determine the driving amount of the focus lens or the driving speed of the focus lens from the detected defocus amount. A state in which the driving amount of the focus lens is larger than a predetermined threshold, or a state in which the driving speed of the focus lens is larger (faster) than a predetermined threshold can be regarded as a state in which the degree of reliability of line-of-sight information is less than a predetermined threshold.

Now let us consider a case where the condition that the driving amount of the focus lens is larger than a predetermined threshold is included in Condition A in the switching process in FIG. 5A. At step S20, the system control unit 50 determines whether or not the driving amount of the focus lens is larger than a predetermined threshold. If the driving amount is equal to or less than the predetermined threshold, the process goes to step S21, where the system control unit 50 executes control to set the display state of the gaze position to the first state. If the driving amount is larger than the predetermined threshold, the process goes to step S22, where the system control unit 50 executes control to set the display state of the gaze position to the second state.

Driving (moving) the zoom lens of the imaging optical system causes a change in image magnification, and a change occurs in the captured image similarly to when the focus lens is driven. Therefore, it is preferable to include the condition that the driving amount of the zoom lens is larger than a predetermined threshold, or the condition that the driving speed of the zoom lens is larger than a predetermined threshold in Condition A when carrying out the switching process in FIG. 5A. Such switching process can be carried out in cases where driving of the zoom lens is detectable, and is performed before (when) the zoom lens is driven. The zoom lens is moved by the user operating the lens unit 150 or the operation unit 70 at a desired timing. The system control unit 50 is able to determine the driving amount of the zoom lens or the driving speed of the zoom lens from an instruction for driving the zoom lens, such as an operation performed to the lens unit 150 or to the operation unit 70. A state in which the driving amount of the zoom lens is larger than a predetermined threshold, or a state in which the driving speed of the zoom lens is larger (faster) than a predetermined threshold can be regarded as a state in which the degree of reliability of line-of-sight information is less than a predetermined threshold.

The captured image may undergo a change (fluctuation) due to a cause other than the driving of the imaging optical system such as the focus lens or zoom lens, such as shaking of the main body 100 (vibration due to unsteady hands holding the main body 100, or the like). When the main body 100 is shaking largely, the shooting range (imaging area) and the display surface of the display unit 28 (captured image on the display surface) are also shaking largely, so that it is highly likely that the user's gaze cannot follow the target object well, which means that the reliability of the visibility information is probably low. Therefore, it is preferable to include the condition that the shaking amount of the main body 100 is larger than a predetermined threshold in Condition A when carrying out the switching process in FIG. 5A. Such switching process can be carried out in cases where shaking of the main body 100 is detectable, and is performed after the shaking of the main body 100 is detected. The system control unit 50 is able to determine the type and amount of shake of the main body 100 from results of detection by the orientation detection unit 55. A state in which the amount of shake (vibration) of the main body 100 is larger than a predetermined threshold can be regarded as a state in which the degree of reliability of line-of-sight information is less than a predetermined threshold.

At step S8, the system control unit 50 performs the processes started at steps S1 to S4 (imaging, live view display, line-of-sight detection, gaze position display, and focus detection). Focus detection is performed in the same manner as that of step S6 (focus detection using the line-of-sight information). The process of step S8 may be performed in parallel with the process of step S7 (driving of the focus lens). The focus detection area may be changed based on a change in the live view display (captured image) or a change in the gaze position.

At step S9, the system control unit 50 determines whether or not the signal SW2 (second shutter switch 64 ON; instruction to shoot; fully-pressed state of the shutter button 61) has been detected. The system control unit 50 advances the process to step S10 if it determines that the signal SW2 has been detected, and returns the process to step S5 if it determines that the signal SW2 has not been detected.

At step S10, the system control unit 50 determines whether or not the captured image is to be recorded (whether the image is to be shot). The system control unit 50 advances the process to step S11 if it determines that captured image is to be recorded, and advances the process to step S12 if it determines that the captured image is not to be recorded. In this embodiment, continuous shooting (successive shooting) is started by the long press of the second shutter switch 64, and the processes of shooting (recording of captured image) and focus detection are switched over during the continuous shooting. The processes may be switched every time an image is captured such that shooting and focus detection are performed alternately. The processes may be switched such that focus detection is performed every several times of shooting (e.g., three times). This way, focus detection can be performed favorably without significantly reducing the number of images taken per unit time.

At step S11, the system control unit 50 records the captured image in the recording medium 200. As required, the system control unit 50 displays the recorded (captured) image in the display unit 28 (image display for confirmation). The shooting instruction may double as the instruction to display an image for confirmation so that the image may be displayed for confirmation automatically after the shooting. The operation unit 70 may receive another instruction (operation) different from the shooting instruction, and the system control unit 50 may execute control for displaying the image for confirmation in response to the instruction. The process is returned to step S9 after step S11.

Image display for confirmation is performed for allowing the user to check the captured image, for example. During the image display for confirmation, there is no need to acquire or display the gaze position (line-of-sight information). Therefore, it is preferable to include the condition that there has been an instruction for displaying an image for confirmation, or that an image is being displayed for confirmation, in Condition A when carrying out the switching process in FIG. 5A. The display state of the gaze position can be favorably controlled this way. Specifically, the user can readily understand whether or not a process based on the line-of-sight information is executable. As described above, the system control unit 50 executes control for displaying the image for confirmation in response to an instruction the operation unit 70 (including the shutter button 61) received from the user. Therefore, the system control unit 50 can determine whether or not there has been an instruction for displaying an image for confirmation, or whether or not an image is being displayed for confirmation, in accordance with the instruction the operation unit 70 (including the shutter button 61) received from the user.

Similarly, when a screen different from the shooting screen (screen during shooting) is being displayed in the display unit 28, there may be cases where acquisition or display of the gaze position (line-of-sight information) is not necessary. Accordingly, it is preferable to include the condition that a screen different from the shooting screen is being displayed in the display unit 28, or the condition that there has been an instruction to display a screen different from the shooting screen in the display unit 28, in Condition A when carrying out the switching process of FIG. 5A. A screen different from the shooting screen is, for example, a camera setting change screen (menu screen) for changing the settings of the camera system, or a communication screen that allows the camera system to communicate with an external device. Similarly to the image display for confirmation, the system control unit 50 executes control for displaying a screen different from the shooting screen in response to the instruction the operation unit 70 received from the user. Therefore, the system control unit 50 can determine whether or not a screen different from the shooting screen is being displayed, or whether or not there has been an instruction to display a screen different from the shooting screen, in accordance with the instruction the operation unit 70 received from the user.

In cases where a screen different from the shooting screen (live view screen) is being displayed together with the shooting screen, line-of-sight detection as well as reception of an instruction based on the detected gaze position may be carried on so as to allow for the operation by the user's gaze while enabling the user to check the shooting screen.

In the case of manual focus (manual adjustment of the focus), too, sometimes acquisition or display of the gaze position (line-of-sight information) is not necessary. Accordingly, it is preferable to include the condition that manual focus is being used, or the condition that there has been an instruction to start manual focus, in Condition A when carrying out the switching process of FIG. 5A. In the case of manual focus, the shooting process in FIG. 4 does not include the focus lens driving at step S7 and the focus detection at steps S4, S6 to S8, and S12. In manual focus, the focus lens is manually driven. The manual focus mode is set by the system control unit 50 in response to an instruction the operation unit 70 received from the user. Therefore, the system control unit 50 can determine whether or not manual focus is being used, or whether or not there has been an instruction to start manual focus, in accordance with the instruction the operation unit 70 received from the user.

In manual focus, the user manually adjusts the focus position to bring an image into focus so that it is necessary to visually check a subtle change of focus in the captured image. When the gaze position is being displayed with high visibility, it is highly possible that the user is unable to adjust the focus position favorably (lowered operability). Therefore, the display state (second state) of the gaze position during manual focus should preferably have sufficiently low visibility, a hidden state being particularly preferable. This can facilitate favorable adjustment of the focus position (improved operability).

At step S12, similarly to step S8, the system control unit 50 performs the processes started at steps S1 to S4 (imaging, live view display, line-of-sight detection, gaze position display, and focus detection). The display period and display update rate (interval) of captured images, display lag and so on at step S12 are different from those of step S8 because of the frame rate of the continuous shooting (shooting frame rate) and the process of generating images to be recorded (recorded images) from captured images. The process is returned to step S9 after step S12.

During the continuous shooting, there may be shutter blackouts, or, images for confirmation may be displayed. The user can hardly see the object in the display unit 28 (electronic viewfinder), so that the reliability of visibility information is probably low. Therefore, it is preferable to include the condition that continuous shooting is being performed in Condition A when carrying out the switching process in FIG. 5A. The system control unit 50 executes control for continuous shooting in response to an instruction the operation unit 70 (including the shutter button 61) received from the user. Therefore, the system control unit 50 can determine whether or not continuous shooting is being performed in accordance with the instruction the operation unit 70 (including the shutter button 61) received from the user. A state in which continuous shooting is being performed can be regarded as a state in which the degree of reliability of line-of-sight information is less than a predetermined threshold.

As described above, if the signal SW1 is not detected at step S5, the process goes to step S13. At step S13, the system control unit 50 determines whether or not there has been an instruction (operation) to end the shooting process. An ending instruction is, for example, an instruction to change the mode of the main body 100 from the shooting mode to other modes, or an instruction to turn off the main body 100. The system control unit 50 ends the shooting process of FIG. 4 if it determines that there has been an ending instruction, and returns the process to step S5 if it determines that there has not been an ending instruction.

Figure 5B:
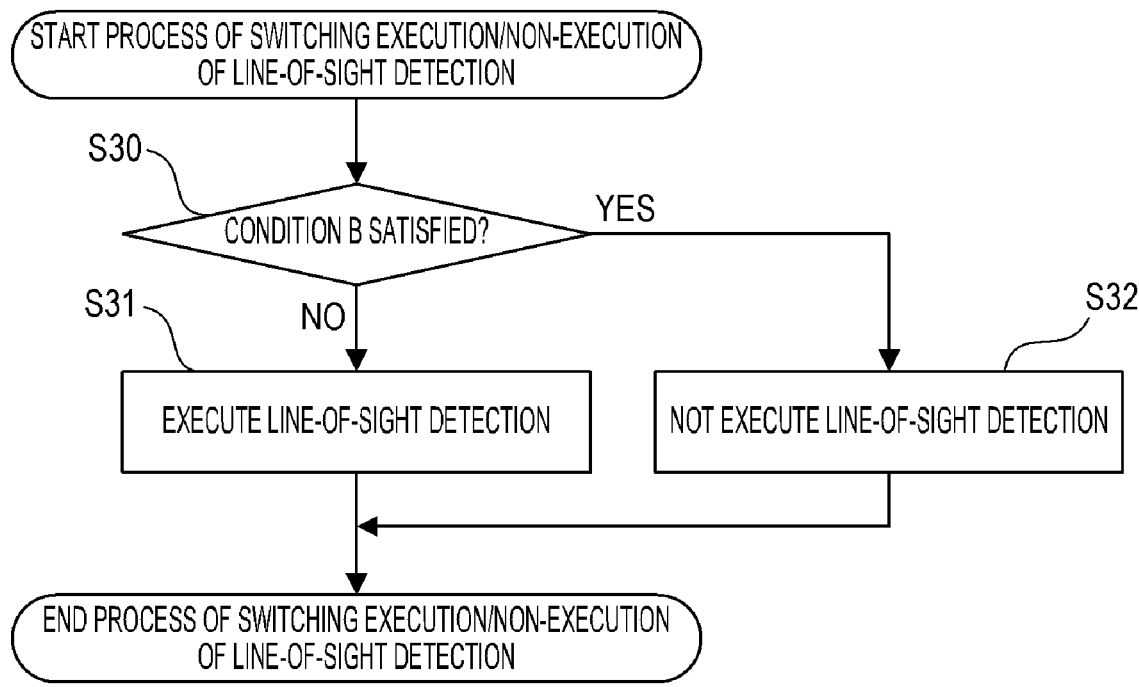

Execution/non-execution of line-of-sight detection (acquisition of line-of-sight information) may be switched in accordance with whether or not a predetermined Condition B is satisfied. FIG. 5B is a flowchart of this switching process (process of switching execution/non-execution of line-of-sight detection).

At step S30, the system control unit 50 determines whether or not Condition B has been satisfied. The system control unit 50 advances the process to step S32 if it determines that Condition B has been satisfied, and advances the process to step S31 if it determines that Condition B has not been satisfied. At step S31, the system control unit 50 executes control to perform line-of-sight detection (start line-of-sight detection). At step S32, the system control unit 50 executes control not to perform line-of-sight detection (stop line-of-sight detection). When the process of step S32 is carried out, the line-of-sight information stops being acquired, so that the gaze position stops being displayed. By stopping line-of-sight detection, power supply to the line-of-sight detection unit 701 is stopped, so that power consumption can be reduced. The processing related to line-of-sight detection is omitted, so that the processing load can be reduced. Alternatively, the system control unit 50 may stop acquisition of line-of-sight information from the line-of-sight detection unit 701 without stopping line-of-sight detection by the line-of-sight detection unit 701. This way, recovery to a state where line-of-sight information is acquired can be achieved in short time.

Condition B may be the same as Condition A, or may be different. When the gaze position (line-of-sight information) need not be acquired or displayed, or when the reliability of the visibility information is particularly low, it is preferable not to display the gaze position. That is, at least one of the following conditions corresponding to these situations should preferably be included in Condition B:

condition that there has been an instruction to display an image for confirmation;

condition that a screen different from the shooting screen is being displayed in the display unit 28;

condition that continuous shooting is being performed; and condition that manual focus is being used.

Candidates for Condition A described above are summarized as follows. Condition A may be one of the following conditions, or may contain several of them:

condition that there has been an instruction to display an image for confirmation;

condition that a screen different from the shooting screen is being displayed in the display unit 28;

condition that continuous shooting is being performed;

condition that manual focus is being used;

condition that the degree of reliability of line-of-sight information is less than a predetermined threshold;

condition that the driving amount of the focus lens is larger than a predetermined threshold;
condition that the driving speed of the focus lens is larger than a predetermined threshold;
condition that the driving amount of the zoom lens is larger than a predetermined threshold;
condition that the driving speed of the zoom lens is larger than a predetermined threshold;
condition that the shake of the main body 100 is larger than a predetermined threshold; and
condition that the exposure at the gaze position is out of a predetermined range.

In cases where Condition A includes a plurality of conditions listed above and when none of the plurality of conditions is satisfied, the process of step S21 of FIG. 5A (switching the display state of the gaze position to the first state) is carried out. When at least one of the plurality of conditions is satisfied, the process of step S22 (switching the display state of the gaze position to the second state) is carried out. Likewise, Condition B may be one condition, or contain several conditions. In cases where Condition B includes a plurality of conditions and when none of the plurality of conditions is satisfied, the process of step S31 of FIG. 5B (executing line-of-sight detection) is carried out. When at least one of the plurality of conditions is satisfied, the process of step S32 (stopping acquisition of line-of-sight information) is carried out.

According to the present disclosure, the display state of the gaze position can be favorably controlled.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-025996, filed Feb. 19, 2020, which is hereby incorporated by reference herein in its entirety.

What is claimed is:

1. An electronic device comprising:
a processor; and
a memory storing a program which, when executed by the processor, causes the electronic device to:
acquire gaze information relating to a gaze position of a user,
execute control for displaying a captured image on a display surface and for displaying a predetermined item in a first state at the gaze position on the display surface, and
switch a display state of the predetermined item from the first state to a second state in which the predetermined item is displayed in a more subdued manner than the first state, in a case where a predetermined first condition is satisfied, wherein
the first condition includes at least one of:
an exposure at the gaze position in the image being out of a predetermined range;
an amount or a speed of driving a focus lens being larger than a predetermined threshold;
an amount or a speed of driving a zoom lens being larger than a predetermined threshold; and
an amount of shake of an imaging apparatus being larger than a predetermined threshold.

2. The electronic device according to claim 1, wherein the first condition further includes at least one of:
a degree of reliability of the gaze information being less than a predetermined threshold, and
continuous shooting being performed.

3. The electronic device according to claim 1, wherein the first condition includes an instruction for displaying a captured image on the display surface being performed.

4. The electronic device according to claim 1, wherein the first condition includes a screen different from a screen for shooting being displayed on the display surface.

5. The electronic device according to claim 1, wherein the first condition includes manual focus being used.

6. The electronic device according to claim 1, wherein the program, when executed by the processor, further causes the electronic device to stop acquiring the gaze information in a case where a predetermined second condition is satisfied.

7. The electronic device according to claim 6, wherein the program, when executed by the processor, further causes the electronic device to:
detect the gaze position and output the gaze information, and
stop detection of the gaze position to stop acquiring the gaze information in a case where the second condition is satisfied.

8. The electronic device according to claim 6, wherein the program, when executed by the processor, further causes the electronic device to:
detect the gaze position and output the gaze information, and
stop acquiring the gaze information without stopping detection of the gaze position in a case where the second condition is satisfied.

9. The electronic device according to claim 6, wherein the second condition includes at least one of:
an instruction for displaying a captured image on the display surface being performed;

a screen different from a screen for shooting being displayed on the display surface;
continuous shooting being performed; and
manual focus being used.

10. The electronic device according to claim 1, wherein the electronic device is an imaging apparatus.

11. The electronic device according to claim 1, wherein the second state is a state in which the predetermined item is displayed in a more subdued manner than the first state by at least one of a change in line style, blinking, and a change of color.

12. A control method of an electronic device, comprising:
acquiring gaze information relating to a gaze position of a user; and
executing control for displaying a captured image on a display surface and for displaying a predetermined item in a first state at the gaze position on the display surface, wherein,
in a case where a predetermined first condition is satisfied, a display state of the predetermined item is switched from the first state to a second state in which the predetermined item is displayed in a more subdued manner than the first state, wherein
the first condition includes at least one of:
an exposure at the gaze position in the image being out of a predetermined range;
an amount or a speed of driving a focus lens being larger than a predetermined threshold;
an amount or a speed of driving a zoom lens being larger than a predetermined threshold; and
an amount of shake of an imaging apparatus being larger than a predetermined threshold.

13. A non-transitory computer readable medium that stores a program, wherein
the program causes a computer to execute a control method of an electronic device, comprising:
acquiring gaze information relating to a gaze position of a user; and
executing control for displaying a captured image on a display surface and for displaying a predetermined item in a first state at the gaze position on the display surface, wherein,
in a case where a predetermined first condition is satisfied, a display state of the predetermined item is switched from the first state to a second state in which the predetermined item is displayed in a more subdued manner than the first state, wherein
the first condition includes at least one of:
an exposure at the gaze position in the image being out of a predetermined range;
an amount or a speed of driving a focus lens being larger than a predetermined threshold;
an amount or a speed of driving a zoom lens being larger than a predetermined threshold; and
an amount of shake of an imaging apparatus being larger than a predetermined threshold.

* * * * *